US006480792B1

(12) United States Patent
Prendergast

(10) Patent No.: US 6,480,792 B1
(45) Date of Patent: Nov. 12, 2002

(54) FATIGUE MONITORING SYSTEMS AND METHODS INCORPORATING NEURAL NETWORKS

(75) Inventor: Terence Prendergast, Preston (GB)

(73) Assignee: British Aerospace Public Limited Company, Farnborough (GB)

( * ) Notice: Subject to any disclaimer, the term of this patent is extended or adjusted under 35 U.S.C. 154(b) by 0 days.

(21) Appl. No.: 09/457,763

(22) Filed: Dec. 10, 1999

Related U.S. Application Data

(63) Continuation of application No. PCT/GB99/03513, filed on Oct. 22, 1999.

(30) Foreign Application Priority Data

Oct. 22, 1998 (GB) .............................................. 9822992

(51) Int. Cl.[7] .......................... G06F 11/00; G01C 21/10

(52) U.S. Cl. .......................... 702/42; 702/46; 73/35.06; 706/22

(58) Field of Search .............................. 702/46, 42, 56, 702/43, 34, 144; 73/35.06, 35.09, 178 H; 700/38; 706/22, 25

(56) References Cited

U.S. PATENT DOCUMENTS

| | | | |
|---|---|---|---|
| 4,336,595 | A | 6/1982 | Adams et al. |
| 4,524,620 | A | 6/1985 | Wright et al. |
| 5,333,240 | A | 7/1994 | Matsumoto et al. |
| 5,413,029 | A | 5/1995 | Gent et al. |
| 5,774,376 | A | 6/1998 | Manning |

FOREIGN PATENT DOCUMENTS

| | | |
|---|---|---|
| DE | 43 36 588 | 5/1995 |
| EP | 0 856 817 | 8/1998 |
| EP | 0 895 197 A1 | 2/1999 |
| FR | 2 698 704 | 6/1994 |
| WO | 90/09644 | 8/1990 |

OTHER PUBLICATIONS

WPI Accession No. 94–218896/199427 & DE 4244014 A1 (Bodensee) Jul. 7, 1994 (see abstract).

WPI Accession No. 78–C7865A/197814 & DE 2737747 A (JPB SARL) Mar. 30, 1978 (see abstract).

*Primary Examiner*—Kamini Shah

(57) ABSTRACT

A fatigue monitoring system and method is disclosed in which a stream of data relating to the stresses experienced at a plurality of locations over the structure during operation is applied to a neural network trained to remove data stream values deemed to be in error. The data from the neural network is then processed to determine the fatigue life.

7 Claims, 4 Drawing Sheets

FATIGUE MONITORING SYSTEMS AND METHODS INCORPORATING NEURAL NETWORKS

This is a continuation of: international Appln. No PCT/GB99/03513 filed Oct. 22, 1999 which designated the U.S.

This invention relates to fatigue monitoring systems and methods and in particular, but not exclusively, to such systems and methods for monitoring fatigue consumption and significant structural events on board an aircraft.

BACKGROUND OF THE INVENTION

It is extremely important to monitor the fatigue life of an aircraft so that it is reassessed or refurbished before the end of the fatigue life.

In one proposal, the fatigue life of an aircraft is measured by monitoring the stress at a multiplicity of locations across the aircraft, defined by a preset template. Range-mean-pairs are determined for the stresses experienced at each location and these are then used to determine from a frequency-of-occurrence matrix whether the aircraft has exceeded its design limits at any one of the locations. By monitoring the fatigue of an aircraft in this way, maintenance actions may be planned effectively, and the fatigue life of a fleet of aircraft may be managed pro-actively, by rotation of the aircraft. The fatigue life and stress spectra of a structure may be monitored at a location either directly, by a suitably calibrated strain gauge or they may be detected indirectly. In this latter method, data is taken from a flight control system relating to the manoeuvres the aircraft has gone through or is going through, from which G-forces, stresses and strains may be calculated.

We have found that there is a problem with both the direct and indirect methods insofar as the data they provide is often corrupted and can give spurious false readings. There may also be calibration problems such that, for example, the air speed readings upon which stresses and strains are calculated may be in error. In a conventional solution, the data is manually analysed by ground staff to reject obviously false readings by inspection. However this is a long labourious task, and expensive for those that have to meet the costs of operating the aircraft.

SUMMARY OF THE INVENTION

Accordingly there is a need for a system and a method which reduces or obviates the need for manual analysis of the data yet which does not substantially compromise the reliability of the data.

In one aspect, this invention provides a fatigue monitoring system for monitoring the structural health of a structure, said system including means for generating a stream of data related to the stresses experienced at a plurality of locations over said structure during operation, means for supplying said stream of data to a neural network trained to remove from the data stream values deemed to be in error, and means for thereafter processing said data to determine the fatigue life of the structuring.

Preferably, the fatigue monitoring system further includes a plurality of sensors disposed at different locations in said structure for producing output signals representative of the local stress at the respective locations, said neural network further being operable to flag the identity of a defective sensor, on the basis of the erroneous data supplied thereby.

Preferably, the fatigue monitoring system includes a movement control system operable to provide data representative of the movement and acceleration of the structure, means storing a plurality of templates or models representing a series of parameter envelopes for typical operating conditions, and means for comparing the data representative of the actual stresses across the structure with a selected template and determining whether the actual stresses lie outside the parameter envelope defined by the selected template. Additionally the means for comparing the data is future operable to provide a coefficient of actual stress life.

Preferably, said neural network is trained on the basis of probability density functions.

Preferably the data supplied by said neural network is processed using a range-mean-pairs algorithm to determine said fatigue life.

In another aspect, this invention provides a fatigue monitoring method, said fatigue monitoring method comprising providing a stream of data related to the stresses experienced at a plurality of locations over the structure during operation, supplying said stream of data to a neural network trained to remove from the data stream values deemed to be in error, and thereafter determining the fatigue life of the structure from the data passed by said neural network.

Whilst the invention has been described above, it extends to any inventive combination of the features set out above or in the following description.

BRIEF DESCRIPTION OF THE DRAWINGS

The invention may be performed in various ways and an embodiment thereof will now be described by way of example only, reference being made to the accompanying drawings in which.

DETAILED DESCRIPTION OF THE INVENTION

Referring to the Figures, we describe below a flexible fatigue monitoring system which can be configured, without recourse to software change as either a direct (strain gauge) based fatigue monitoring system or as an indirect (parametric) based system. The fatigue monitoring system performs real time fatigue calculations and determines the life consumed by the airframe. Significant structural events and flight performance parameters may also be monitored.

Figure 1:
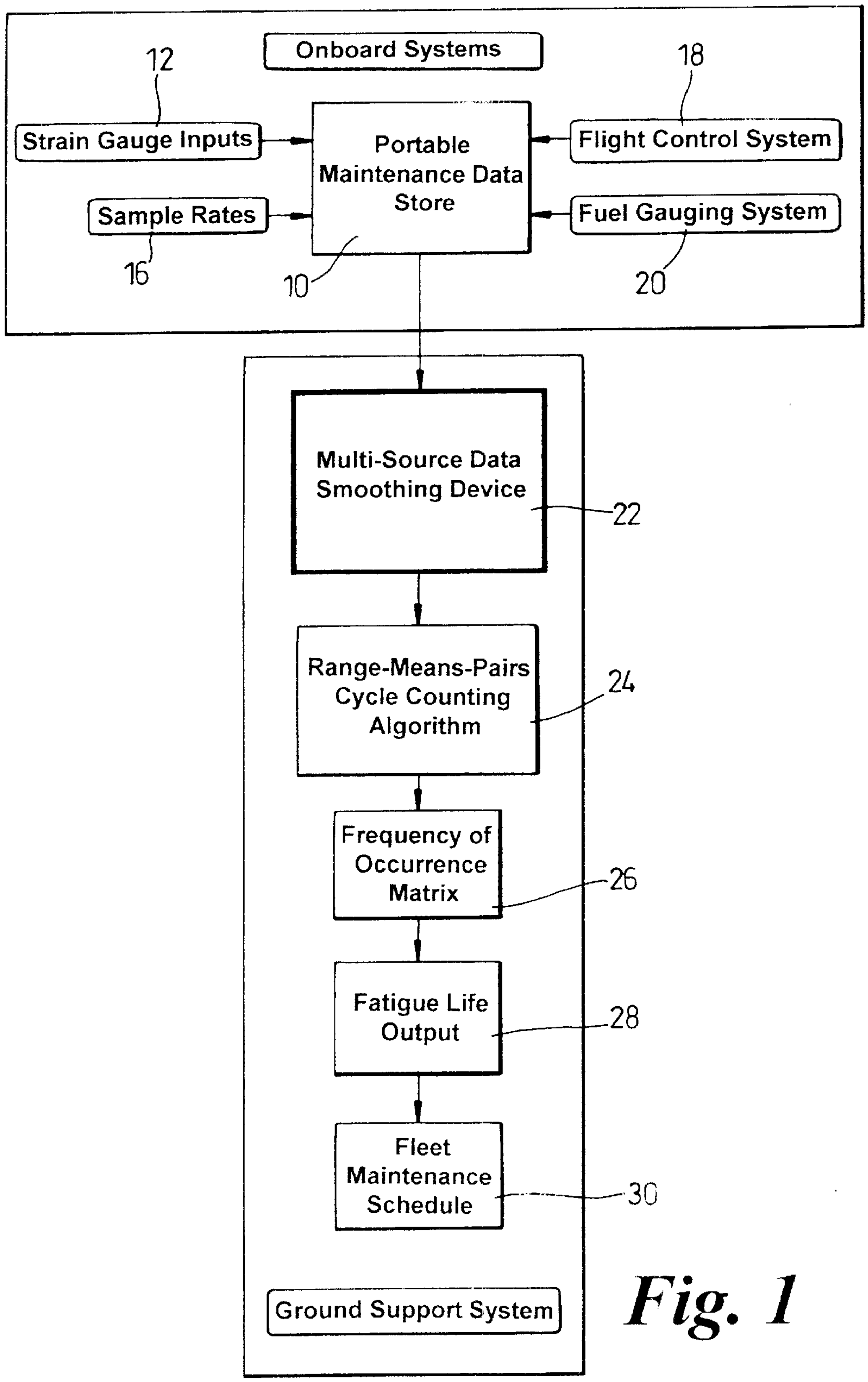
FIG. 1 is a block diagram of a fatigue monitoring system in accordance with this invention.

In FIG. 1, a portable maintenance data store 10 is removably mounted on the aircraft and stores structural health monitoring data for up to five individual flights. This data may be obtained from strain gauge inputs 14 at a particular sample rate indicated at 16. In addition or instead, the portable maintenance data store 10 may also receive the parametric data required from the flight control system 18 and the fuel gauging system 20 to determine the stress at each location. The flight control system provides details of the altitude, velocities and accelerations of the aircraft and the fuel gauging system provides fuel mass information. This information is used to calculate the stress at a number of locations by comparison with a large number of templates held in internal memory. The templates each correspond to a particular aircraft configuration and set of flight parameters (e.g. altitude and Mach No.), and are derived from finite element analysis and the results of ground based airframe fatigue tests.

As noted above, the data stored on the portable maintenance store is often corrupted, giving spurious false readings. Accordingly, in this embodiment, the raw data from the portable management data store is first passed via a multi-source data smoothing device 22 where it is processed to "clean" it using a combination of density estimation functions in conjunction with a neural network to remove data values from the data streams deemed to be in error.

Having cleaned the data in this way, it is processed at 24 using a range-means-pairs cycle counting algorithm. The counts at each of the monitored locations over the aircraft structure are then applied to a frequency of occurrence matrix at 26 to allow the remaining fatigue life of the aircraft structure to be determined at each of the different locations across the structure, at 28. The use of a frequency of occurrence matrix is a well known and used technique and is described in the Royal Aircraft Establishment Technical Report 81122 of October 1981 "A combined range-means-pairs rainflow count of load time histories for use in the formulation of structurally relevant cost functions and fatigue analysis" by Susan. D. Ellis.

Thereafter, knowing the fatigue life profile across the aircraft structure, the fleet maintenance schedule may be determined at 30, and if necessary the role of the aircraft changed to ensure that the percentage fatigue life consumption is generally uniform across the aircraft structure.

Figure 2:
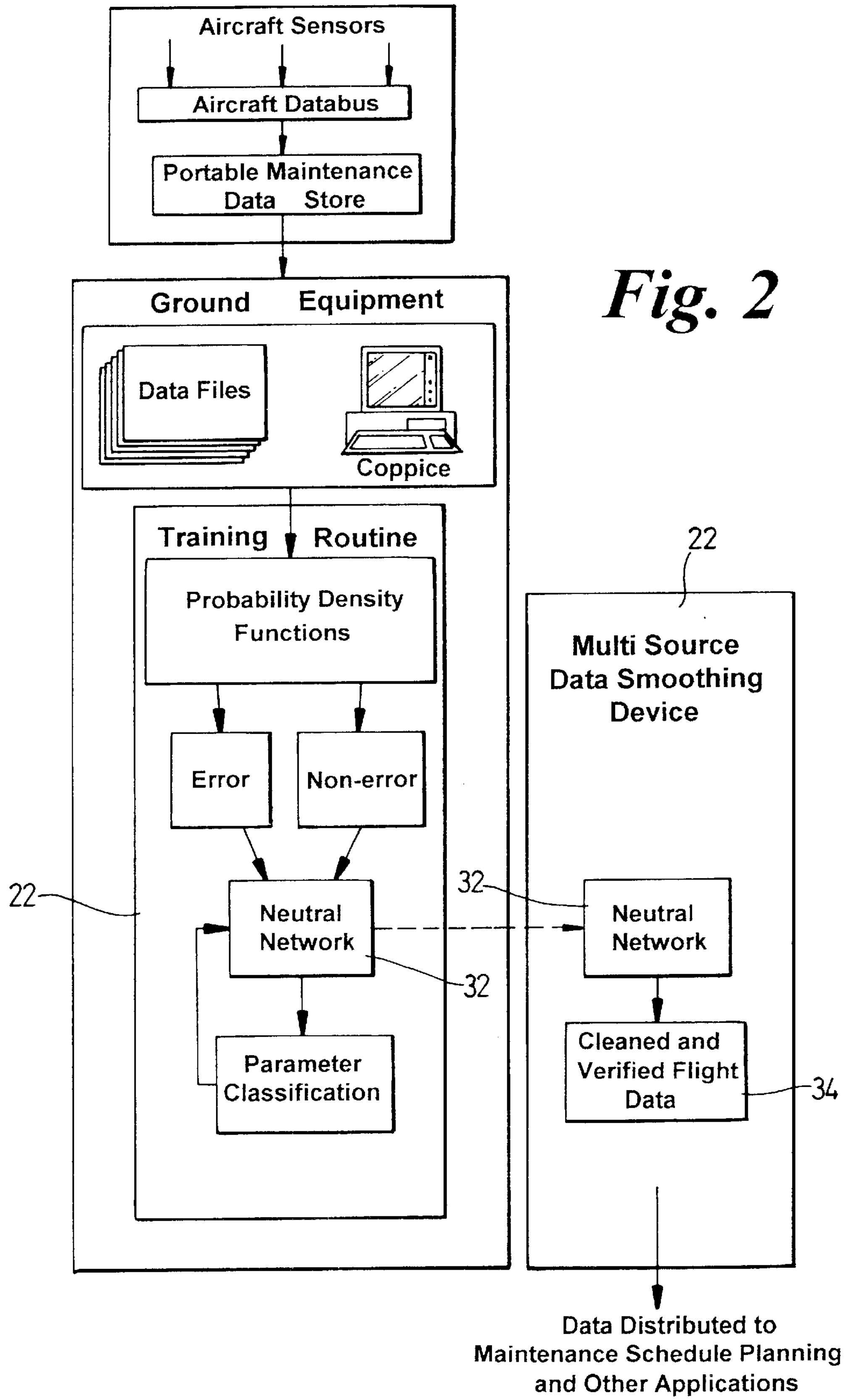
FIG. 2 is a block diagram illustrating the training routine for the neural network.

Referring now to FIG. 2 there is shown schematically the training routine implemented to produce the multi-source data smoothing device 22. During the training routine, sets of training data including probability density functions of typical inputs including error/non-error results are fed to a neural network 32, to train the network to give the appropriate response to the training sets of data.

Figure 3:
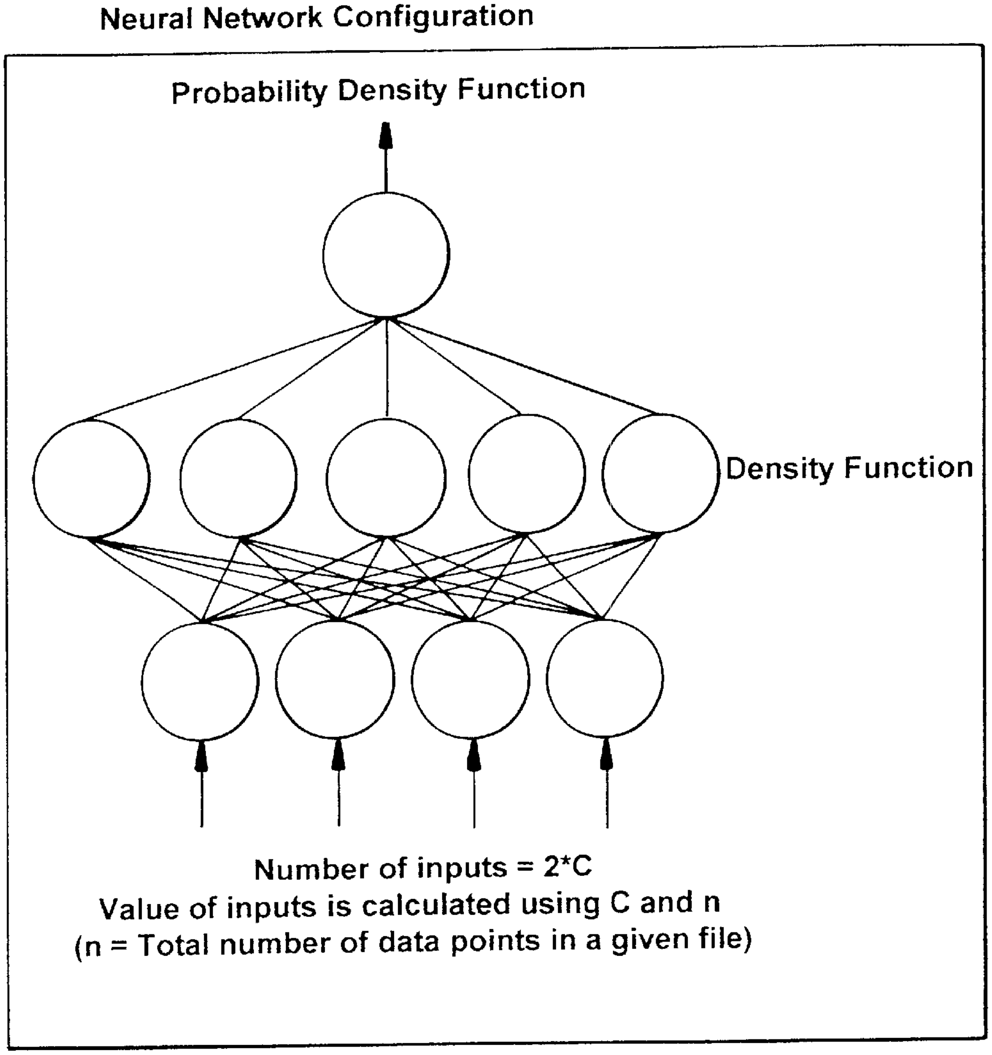
FIG. 3 is a block diagram of a suitable configuration of neural network for use in a multi-source data smoothing device in the system of FIG. 1.

The neural network used is a radial basis function which is similar in function to a Multi-layer perceptron (MLP) of the type shown in FIG. 3, but employing radial functions in the hidden layer. The nature and use of neural networks comprising radial basis functions (RBF) will be well known to those skilled in the art. In this system the hidden layer employs density functions, giving the output as a probability density function. The input vector is calculated using the current data point and all points inside a parameter C which defines the size of the input vector. Having programmed the neural network during this training routine, it is then supplied with actual data from the portable maintenance data store to effect cleaning and verification thereof at 34.

In operation, the data stored on the portable maintenance data store is processed by the multi-source data smoothing device to identify corrupted data values, to mark them and also to reconstruct replacement values if feasible.

It will be appreciated that the input to the multi-source data smoothing device may be from the portable maintenance data store, a bulk storage device on the aircraft or even in real time from the strain gauge inputs or the parametric inputs and all such data is referred to herein as data related to the aircraft stresses. The multi-source data smoothing device could be dedicated hardware, or run on a personal computer, or incorporated in the systems on board a vehicle such as an aircraft. One possibility provided by this system is rotation of aircraft in a fleet to even out stress life. Currently, scheduled maintenance is generated by the number of flying hours clocked up by an aircraft. Depending on the missions flown during this period, the aircraft may not require maintenance at this interval, or may urgently require maintenance before the interval. The use of this system will eliminate the inaccuracies introduced by fleet schedules, allowing greater availability and lowering the life cycle costs of the aircraft.

Figure 4:
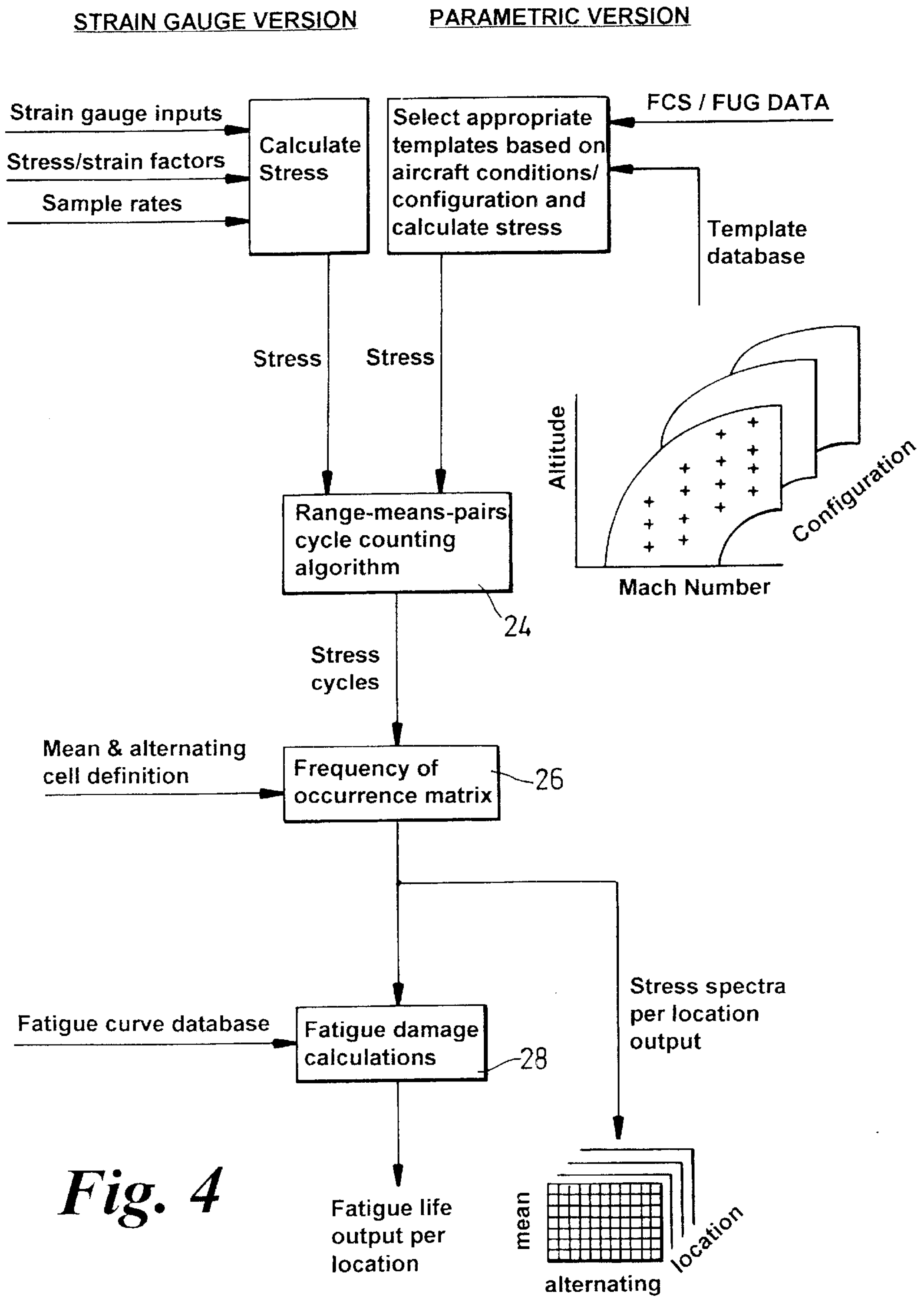
FIG. 4 is a more detailed schematic diagram of a fatigue life calculation system of this invention.

Referring now to FIG. 4, as previously noted, the stress data may be derived either directly from strain gauges, or indirectly from real time data captured from the flight control system and the fuel gauge system. In the indirect method the stresses at each location are calculated and then compared with a template or templates based on the aircraft conditions and configuration to calculate the stresses. The templates may comprise envelopes of aircraft speed vs. altitude, for each of a series of different configurations of the aircraft. In this way the idealised flight profile, in stress terms, may be compared with the actual flight profile, in terms of stress. The difference can be factorised to give a coefficient of actual stress life for the flight, allowing more accurate maintenance scheduling.

Furthermore, the data can be analysed in such a way that the difference between an actual stress occurrence and a spurious strain gauge return can be detected, and so the strain gauges and the airframe may be monitored. From the frequency of occurrence matrix 26 is obtained on a series of stress spectra for each of the monitored locations. Each stress spectra is in terms of the "mean" and "alternating" or range parameter, in accordance with the range-mean-pairs algorithm previously referenced. The cell definition or step size is set at 36. The fatigue life, or damage calculations are calculated at 28 on the basis of fatigue curves from a fatigue curve database 38; which typically comprises S-N curves relating the alternating stress S to the endurance N (i.e., number of cycles), for a number of different mean stress levels.

What is claimed is:

1. A fatigue monitoring system for monitoring the structural health of a structure, said system including means for generating a stream of data related to the stresses experienced at a plurality of locations over said structure during operation, means for supplying said stream of data to a neural network trained to remove from the data stream values deemed to be in error, and means for thereafter processing said data to determine the fatigue life of the structure.

2. A fatigue monitoring system according to claim 1, further including a plurality of sensors disposed at different locations on said structure, and for producing output signals representative of the local stress at the respective locations, said neural network further being operable to flag the identity of a defective sensor.

3. A fatigue monitoring system according to claim 1, including a movement control system operable to provide data representative of the movement and acceleration of the structure, means for storing a plurality of templates or models representing a series of parameter envelopes for typical operating conditions, and means for comparing the data representative of the actual stresses across the structures with a selected template and determining whether the actual stresses lie outside the parameter envelope defined by the selected template.

4. A fatigue monitoring system according to claim 3, wherein said means for comparing the data is further operable to provide a coefficient of actual stress life.

5. A fatigue monitoring system according to claim 1, wherein said neural network is trained on the basis of probability functions relating to the monitored data.

6. A fatigue monitoring system according to claim 1, wherein the data from said neural network is processed using a range-means-pairs algorithm to determine said fatigue life.

7. A fatigue monitoring method comprises providing a stream of data related to the stresses experienced at a plurality of locations over the structure during operation, supplying said stream of data to a neural network trained to remove from the data stream values- deemed to be in error, and thereafter determining the fatigue life of the structure from the data passed by said neural network.

* * * * *